(12) United States Patent
Hao et al.

(10) Patent No.: US 12,012,016 B2
(45) Date of Patent: Jun. 18, 2024

(54) AUTOMOBILE AND SLIDING RAIL ASSEMBLY OF SEAT THEREOF

(71) Applicant: HUBEI AVIATION PRECISION MACHINERY TECHNOLOGY CO., LTD., Hubei (CN)

(72) Inventors: Haoshuai Hao, Xiangyang (CN); Hongchao Li, Xiangyang (CN); Kele Huang, Xiangyang (CN); Yan An, Xiangyang (CN)

(73) Assignee: HUBEI AVIATION PRECISION MACHINERY TECHNOLOGY CO., LTD., Xiangyang (CN)

( * ) Notice: Subject to any disclaimer, the term of this patent is extended or adjusted under 35 U.S.C. 154(b) by 712 days.

(21) Appl. No.: 17/254,140

(22) PCT Filed: May 6, 2019

(86) PCT No.: PCT/CN2019/085648
§ 371 (c)(1),
(2) Date: Dec. 18, 2020

(87) PCT Pub. No.: WO2020/133866
PCT Pub. Date: Jul. 2, 2020

(65) Prior Publication Data
US 2021/0268939 A1    Sep. 2, 2021

(30) Foreign Application Priority Data

Dec. 25, 2018    (CN) .......................... 201811592913.1

(51) Int. Cl.
*B60N 2/07*    (2006.01)
(52) U.S. Cl.
CPC ............ *B60N 2/0722* (2013.01); *B60N 2/072* (2013.01)

(58) Field of Classification Search
CPC ...... B60N 2/07; B60N 2/0722; B60N 2/0727; B60N 2/0702; B60N 2/0705; B60N 2/0715; B60N 2/072
See application file for complete search history.

(56) References Cited

U.S. PATENT DOCUMENTS

| 8,398,045 B2 | 3/2013 | Kimura |
| 10,611,272 B2 | 4/2020 | Quast et al. |

(Continued)

FOREIGN PATENT DOCUMENTS

| CN | 101130347 A | 2/2008 |
| CN | 202399944 U | 8/2012 |

(Continued)

OTHER PUBLICATIONS

PCT International Search Report and Written Opinion, PCT/CN2019/085648, Aug. 16, 2019, 12 pgs.

(Continued)

*Primary Examiner* — Gregory A Blankenship
(74) *Attorney, Agent, or Firm* — Kilpatrick Townsend & Stockton LLP

(57) ABSTRACT

A sliding rail assembly includes an upper sliding rail and a lower sliding rail extending along a back-and-forth direction as well as an upper ball and a lower ball disposed therebetween. The lower sliding rail includes a horizontal base plate, a first vertical side plate connected to the upper portion at the left edge of the horizontal base plate, and a first horizontal top plate connected to the right side at the upper edge of the first vertical side plate; the upper sliding rail comprises a first inclined plate and a second inclined plate; the extension line of the first inclined plate with the first vertical side plate and the extension line of the first horizontal top plate to form an upper triangular region; the extension line of the second inclined plate intersects the (Continued)

horizontal base plate and the first vertical side plate to form a lower triangular region.

15 Claims, 1 Drawing Sheet

(56) References Cited

U.S. PATENT DOCUMENTS

| | | | |
|---|---|---|---|
| 2008/0048087 | A1 | 2/2008 | Kojima et al. |
| 2012/0032060 | A1* | 2/2012 | Suzuki ................. B60N 2/0705 |
| | | | 248/430 |
| 2012/0145869 | A1 | 6/2012 | Kimura |
| 2012/0160981 | A1 | 6/2012 | Kimura |
| 2012/0160982 | A1 | 6/2012 | Kimura |
| 2013/0341983 | A1 | 12/2013 | Kimura |
| 2018/0079325 | A1* | 3/2018 | Hayashi ............... B60N 2/0843 |
| 2019/0001842 | A1 | 1/2019 | Quast et al. |
| 2020/0376985 | A1* | 12/2020 | Kawai ................. B60N 2/0732 |
| 2023/0191957 | A1* | 6/2023 | Viguier ................ B60N 2/0705 |
| | | | 296/65.13 |
| 2023/0211708 | A1* | 7/2023 | Ozawa ................... B60N 2/073 |
| | | | 296/65.13 |

FOREIGN PATENT DOCUMENTS

| | | |
|---|---|---|
| CN | 202608593 U | 12/2012 |
| CN | 103029600 A | 4/2013 |
| CN | 104015634 B | 5/2016 |
| CN | 207173355 U | 4/2018 |
| CN | 108473072 A | 8/2018 |
| CN | 109383336 A | 2/2019 |
| CN | 209224998 U | 8/2019 |
| DE | 10039510 A1 | 2/2002 |
| DE | 10 2016 225839 A1 | 3/2018 |
| EP | 2418118 A1 | 2/2012 |
| JP | 2002160554 A | 6/2000 |
| JP | 2000233670 A | 8/2000 |
| JP | 2016-179773 A | 10/2016 |
| KR | 10-2012-0011523 A | 2/2012 |
| KR | 10-2017-0115688 A | 10/2017 |
| WO | WO 2006/000287 * 1/2006 ........... B60N 2/0705 |
| WO | WO 2017/056504 A1 | 4/2017 |

OTHER PUBLICATIONS

European Patent Office, Extended European Search Report, EP Patent Application No. 19902954.7, Aug. 12, 2022, nine pages.
China National Intellectual Property Administration, Office Action, Chinese Patent Application No. 201811592913.1, Jul. 4, 2023, 16 pages.
European Patent Office, Examination Report, European Patent Application No. 19902954.7, Aug. 2, 2023, seven pages.
State Intellectual Property Office of the People's Republic of China, the second office Action Issued in Application No. 201811592913.1, Dec. 22, 2023, 13 pages.

* cited by examiner

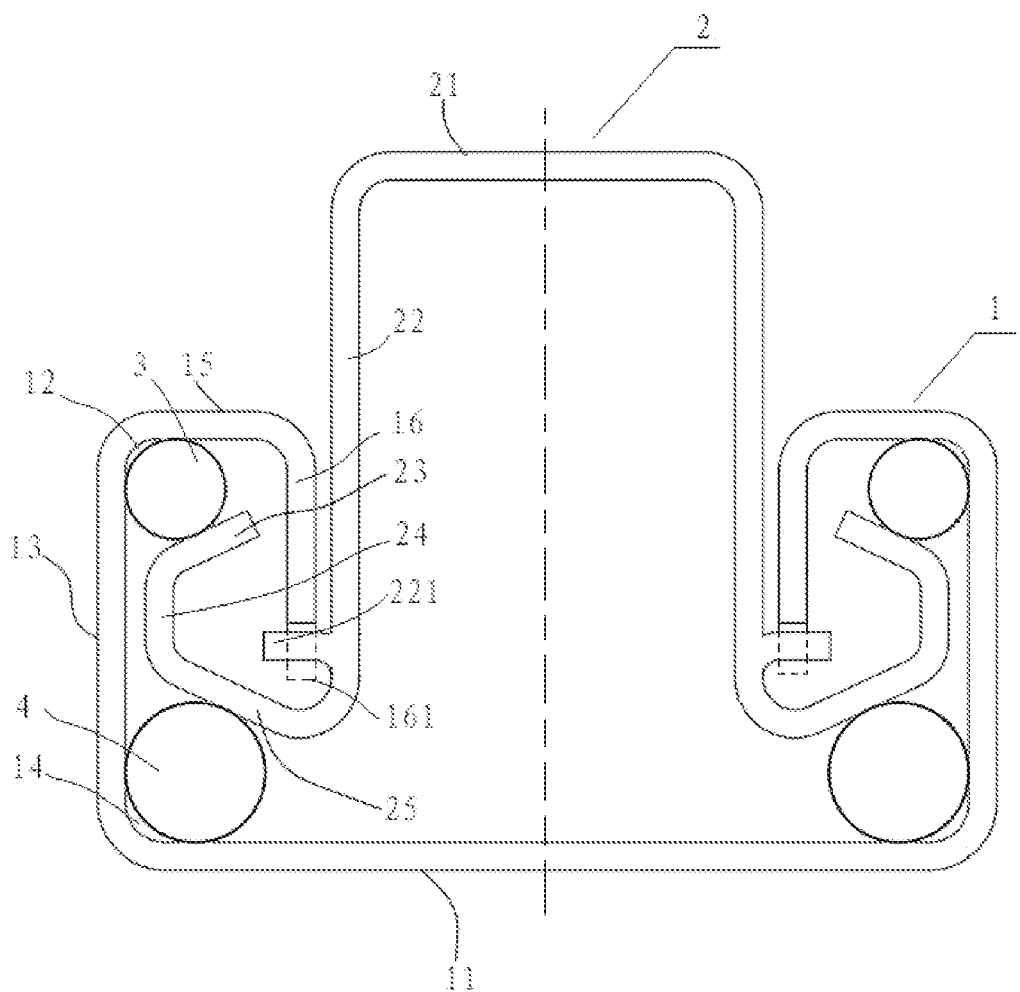

AUTOMOBILE AND SLIDING RAIL ASSEMBLY OF SEAT THEREOF

The present application is a 35 U.S.C. 371 Patent Application of PCT Application No. PCT/CN2019/085648, filed on May 6, 2019, which claims the priority to Chinese Patent Application No. 201811592913.1, titled "AUTOMOBILE AND SLIDING RAIL ASSEMBLY OF SEAT THEREOF", filed with the China National Intellectual Property Administration on Dec. 25, 2018, each of which is incorporated herein by reference in its entirety.

FIELD

The present application relates to the technical field of automobiles, and in particular to an automobile and a sliding rail assembly of seat thereof.

BACKGROUND

A sliding rail assembly is generally mounted at the bottom of an automobile seat, so that the driver can adjust the position of the seat according to his own body shape. The sliding rail assembly ensures the driver to sit in a most comfortable position and thus to be able to conveniently operate the steering wheel, accelerator pedal, clutch and other operating components.

An existing typical automobile seat sliding rail assembly includes a lower sliding rail and an upper sliding rail. The lower sliding rail is fixed on the bottom surface of the automobile body, the upper part of the upper sliding rail is fixedly connected with the bottom of the seat, and the lower part of the upper sliding rail is embedded in the lower sliding rail and can slide along the lower sliding rail. Balls are arranged between the upper sliding rail and the lower sliding rail, and the upper and lower sides of the balls are in contact with the upper sliding rail and the lower sliding rail.

In the application process, however, it is found that when the seat position is adjusted back and forth by using this kind of automobile seat sliding rail assembly, there may be the problems of seat sticking and wobbling from side to side.

In view of this, a technical problem that needs to be solved by those skilled in the art is to develop a sliding rail assembly of an automobile seat, which can avoid the disadvantages of seat sticking and wobbling from side to side in the adjustment process.

SUMMARY

In order to solve the above technical problem, the present application provides a sliding rail assembly of an automobile seat: the sliding rail assembly is symmetrical left and right, and includes an upper sliding rail and a lower sliding rail extending along a front-back direction, and an upper ball and a lower ball arranged between the upper sliding rail and the lower sliding rail; the lower sliding rail includes a horizontal bottom plate, a first vertical side plate connected above the left edge of the horizontal bottom plate and a first horizontal top plate connected to the right side of the upper edge of the first vertical side plate; the upper sliding rail includes a first inclined plate and a second inclined plate; the extension line of the first inclined plate intersects the first vertical side plate and the extension line of the first horizontal top plate to form an upper triangular area; the upper ball is mounted in the upper triangular area and is in point contact with the first inclined plate, the first vertical side plate and the first horizontal top plate; the extension line of the second inclined plate intersects the horizontal bottom plate and the first vertical side plate to form a lower triangular area; the lower ball is mounted in the lower triangle area and is in point contact with the second inclined plate, the horizontal bottom plate and the first vertical side plate; when the seat is adjusted, the upper ball does not move left and right under the interference of the first vertical side plate and the first inclined plate, and at the same time, the upper ball contacts with the first horizontal top plate and the first inclined plate, so that the upper ball has enough bearing capacity. Similarly, the lower ball does not move left and right under the interference of the first vertical side plate and the second inclined plate, and at the same time, the lower ball contacts with the horizontal bottom plate and the second inclined plate, so that the lower ball has enough bearing capacity. As a result, the sliding rail assembly solves the problem of seat wobbling and at the same time ensures enough bearing capacity.

In the sliding rail assembly, the included angle between the first inclined plate and the first horizontal top plate and the included angle between the second inclined plate and the horizontal bottom plate are equal or complementary to each other.

In the sliding rail assembly, the connection between the first horizontal top plate and the first vertical side plate transitions smoothly, and the inner surface of the connection defines a first arc-shaped groove. The first arc-shaped groove extends in the front-rear direction and has an arc-shaped cross section, and the diameter of the first arc-shaped groove is smaller than the diameter of the upper ball; the connection between the horizontal bottom plate and the first vertical side plate transitions smoothly, and the inner surface of the connection defines a second arc-shaped groove. The second arc-shaped groove extends in the front-rear direction and has an arc-shaped cross section, and the diameter of the second arc-shaped groove is smaller than the diameter of the lower ball.

In the sliding rail assembly, the diameter of the upper ball is smaller than the diameter of the lower ball.

In the sliding rail assembly, the lower sliding rail further includes a second vertical side plate. The second vertical side plate is connected below the right edge of the first horizontal top plate, and both the front end and the rear end of the second vertical side plate are respectively provided with limiting plates extending downwards; the upper sliding rail further includes a third vertical side plate, and a convex rib extending leftward is provided on the third vertical side plate; when the upper sliding rail slides forward to a limit position, the convex rib abuts against the limiting plate at the front end. When the upper sliding rail slides backward to another limit position, the convex rib abuts against the limiting plate at the rear end.

In the sliding rail assembly, the upper sliding rail further includes a fourth vertical side plate, the right edge of the second inclined plate is connected with the lower edge of the third vertical side plate, and the left edge of the second inclined plate is connected with the left edge of the first inclined plate through the fourth vertical side plate.

In the sliding rail assembly, the lower sliding rail is an integrated structure formed by bending a raw material plate, and the upper sliding rail is also an integrated structure formed by bending a raw material plate.

The present application further provides an automobile, a sliding rail assembly is connected to the bottom of the seat of the automobile, and the sliding rail assembly is the sliding rail assembly described in any one of the above.

Since the sliding rail assembly has the above technical effects, the automobile with the sliding rail assembly must also have the above technical effects, which will not be repeated here.

BRIEF DESCRIPTION OF THE DRAWINGS

FIG. 1 is a schematic cross-sectional view of a specific embodiment of the sliding rail assembly provided by the present application.

Referential numerals in FIG. 1 are as follows:

1 lower sliding rail
2 upper sliding rail
3 upper ball
4 lower ball
11 horizontal bottom plate
12 first arc-shaped groove
13 first vertical side plate
14 second arc-shaped groove
15 first horizontal top plate
16 second vertical side plate
21 second horizontal top plate
22 third vertical side plate
23 first inclined plate
24 fourth vertical side plate
25 second inclined plate
161 limiting plate
221 convex rib

DETAILED DESCRIPTION

In order to provide those skilled in the art a better understanding of the solutions of the present application, the present application is described hereinafter in further detail in conjunction with the drawings and embodiments.

First of all, it is considered that in the background technology, when a seat is adjusted, the ball of the sliding rail assembly may displace in the left and right direction, which is the main reason for the seat wobbling. Therefore, preventing the left and right displacement of the balls is the key to solve the seat wobbling. At the same time, in the process of limiting the left and right movement of the balls, it is necessary to comprehensively consider the bearing capacity of the balls.

Referring to FIG. 1, FIG. 1 is a schematic cross-sectional view of a specific embodiment of a sliding rail assembly provided by the present application.

The sliding rail assembly includes an upper sliding rail 2 extending in a front-rear direction, a lower sliding rail 1 extending in the front-rear direction, and an upper ball 3 and a lower ball 4 mounted between the two. In addition, the sliding rail assembly is left-right symmetrical, and the following description only takes the left half of the sliding rail assembly as an example.

The lower sliding rail 1 includes a horizontal bottom plate 11, a first vertical side plate 13 connected above a left edge of the horizontal bottom plate 11 and a first horizontal top plate 15 connected to a right side of the upper edge of the first vertical side plate 13.

The upper sliding rail 2 includes a first inclined plate 23 and a second inclined plate 25. An extension line of the first inclined plate 23 intersects with the first vertical side plate 13 and an extension line of the first horizontal top plate 15 to form an upper triangular area. An extension line of the second inclined plate 25 intersects with the horizontal bottom plate 11 and the first vertical side plate 13 to form a lower triangular area.

The upper ball 3 is mounted in the upper triangular area, and the lower right side thereof is in point contact with the first inclined plate 23, the left side thereof is in point contact with the vertical side plate, and the upper side thereof is in point contact with the first horizontal top plate 15, forming three contact points.

The lower ball 4 is mounted in the lower triangular area, and the upper right side thereof is in point contact with the second inclined plate 25, the left side thereof is in point contact with the first vertical side plate 13, and the lower side thereof is in point contact with the horizontal bottom plate 11, forming another three contact points.

When the seat is adjusted, the upper ball 3 does not move left or right under the interference of the first vertical side plate 13 and the first inclined plate 23, and at the same time, the upper ball 3 contacts with the first horizontal top plate 15 and the first inclined plate 23, so that the upper ball 3 has enough bearing capacity. Similarly, the lower ball 4 does not move left or right under the interference of the first vertical side plate 13 and the second inclined plate 25, and at the same time, the lower ball 4 contacts with the horizontal bottom plate 11 and the second inclined plate 25, so that the lower ball 4 has enough bearing capacity. As a result, the sliding rail assembly solves the problem of seat wobbling and at the same time ensures enough bearing capacity.

In specific implementation, the included angle between the first inclined plate 23 and the first horizontal top plate 15 is equal to the included angle between the second inclined plate 25 and the horizontal bottom plate 11. Moreover, since the first vertical side plate 13 is perpendicular to the first horizontal top plate 15 and the horizontal bottom plate 11, the upper triangular area is similar to the lower triangular area. With this arrangement, the problem of speed mismatch between the upper ball 3 and the lower ball 4 during the movement can be avoided, which is beneficial to improving the sliding smoothness of the upper sliding rail 2.

In a specific implementation, the first horizontal top plate 15 of the lower sliding rail 1 and the first vertical side plate 13 are connected and smoothly transitioned, and the inner surface of the connection defines a first arc-shaped groove 12. The first arc-shaped groove 12 extends in the front-rear direction and has an arc-shaped cross section, and the diameter of the first arc-shaped groove 12 is smaller than the diameter of the upper ball 3. Similarly, the horizontal bottom plate 11 and the first vertical side plate 13 are connected and smoothly transitioned, and the inner surface of the connection defines a second arc-shaped groove 14. The second arc-shaped groove 14 extends in the front-rear direction and has an arc-shaped cross section, and the diameter of the second arc-shaped groove 14 is smaller than the diameter of the lower ball 4. With this arrangement, it not only facilitates the point contact of the upper ball 3 with the first vertical side plate 13 and the first horizontal top plate 15 and the point contact of the lower ball 4 with the horizontal bottom plate 11 and the first vertical side plate 13, but also ensures the upper sliding rail 2 and the lower sliding rail 1 have enough bending resistance.

Preferably, the diameter of the upper ball 3 is smaller than diameter of the lower ball 4. Since the lower ball 4 bears a relatively large load, it is advantageous to improve the bearing capacity of the sliding rail assembly.

In a specific implementation, the lower sliding rail 1 further includes a second vertical side plate 16 connected below the right edge of the first horizontal top plate 15. Moreover, the upper sliding rail 2 further includes a second horizontal top plate 21 and a third vertical side plate 22 connected below the left edge of the second horizontal top plate 21. Moreover, there is a gap between the third vertical side plate 22 and the second vertical side plate 16, and the width of the gap is consistent from top to bottom, which can avoid the problem that the upper sliding rail 2 is easily stuck due to the gap being wide at the top and narrow at the bottom or wide at the top and narrow at the bottom.

Moreover, downward extending limiting plates 161 are respectively provided at the front end and the rear end of the second vertical side plate 16. Meanwhile, a convex rib 221 extending leftward is provided on the third vertical side plate 22. When the upper sliding rail 2 slides forward to the limit position, the convex rib 221 abuts against the limiting plate 161 at the front end. When the upper sliding rail 2 slides backward to the limit position, the convex rib 221 abuts against with the limiting plate 161 at the rear end. With this arrangement, the risk of the upper sliding rail 2 falling off the lower sliding rail 1 can be avoided.

In specific implementation, the upper sliding rail 2 further includes a fourth vertical side plate 24, the right edge of the second inclined plate 25 is connected with the lower edge of the third vertical side plate 22. The left edge of the second inclined plate 25 is connected to the lower edge of the fourth vertical side plate 24, the upper edge of the fourth vertical side plate 24 is connected to the left edge of the first inclined plate 23, there is a certain distance between the left edge of the first inclined plate 23 and the third vertical side plate 22. With this arrangement, the first inclined plate 23, the fourth vertical side plate 24, the second inclined plate 25 and the third vertical side plate 22 jointly encloses into a trapezoidal area with a large volume, which provides enough accommodation space for the locking mechanism for locking the upper sliding rail 2 and facilitates the arrangement of the locking mechanism.

In specific implementation, the upper sliding rail 2 as a whole can be formed by bending a raw material board, and the lower sliding rail 1 as a whole can also be formed by bending a raw material board. Compared with the method of the splicing multiple plates, it is more beneficial to improving the bending resistance and bearing capacity.

In addition, an automobile is further provided by the present application, and a sliding rail assembly is connected to the bottom of the seat of the automobile. In a specific implementation, the bottom of the seat can be fixedly connected with the second horizontal top plate 21 of the upper sliding rail 2, and the bottom surface of the automobile body can be fixedly connected to the horizontal bottom plate 11 of the lower sliding rail 1. Specifically, connecting holes can be formed on the horizontal bottom plate 11 and the second horizontal top plate 21, and the horizontal bottom plate 11 and the second horizontal top plate 21 can be connected by fasteners or welded together directly.

The automobile and sliding rail assembly of seat thereof according to the present application are described in detail hereinbefore. The principle and embodiments of the present application are described through specific examples herein. The description of the above-described embodiments is merely used to facilitate understanding the method and core idea of the present application. It should be noted that, for those skilled in the art, various improvements and modifications may be further made to the present application without departing from the principle of the present application, and these improvements and modifications also fall within the protection scope defined by the claims of the present application.

The invention claimed is:

1. A sliding rail assembly of an automobile seat, comprising a lower sliding rail and an upper sliding rail extending along a front-back direction, and an upper ball and a lower ball arranged between the lower sliding rail and the upper sliding rail, wherein the sliding rail assembly is symmetrical left and right,
    the lower sliding rail comprises a horizontal bottom plate, a first vertical side plate connected above a left edge of the horizontal bottom plate and a first horizontal top plate connected to a right side of an upper edge of the first vertical side plate, the upper sliding rail comprises a first inclined plate and a second inclined plate; and
    an extension line of the first inclined plate intersects the first vertical side plate and an extension line of the first horizontal top plate to form an upper triangular area; and
    the upper ball is mounted in the upper triangular area and is in point contact with the first inclined plate, the first vertical side plate and the first horizontal top plate; and
    an extension line of the second inclined plate intersects the horizontal bottom plate and the first vertical side plate to form a lower triangular area; the lower ball is mounted in the lower triangle area and is in point contact with the second inclined plate, the horizontal bottom plate and the first vertical side plate,
    wherein, the lower sliding rail further comprising a second vertical side plate, and the second vertical side plate is connected below a right edge of the first horizontal top plate, and both the front end and the rear end of the second vertical side plate are respectively provided with limiting plates extending downwards; and
    the upper sliding rail further comprises a third vertical side plate, and a convex rib extending leftward is provided on the third vertical side plate; and
    when the upper sliding rail slides forward to a limit position, the convex rib abuts against the limiting plate at the front end; and
    when the upper sliding rail slides backward to another limit position, the convex rib abuts against the limiting plate at the rear end.

2. The sliding rail assembly according to claim 1, wherein, a connection between the first horizontal top plate and the first vertical side plate transitions smoothly, and an inner surface of the connection defines a first arc-shaped groove, and the first arc-shaped groove extends in a front-rear direction and has an arc-shaped cross section, and a diameter of the first arc-shaped groove is smaller than a diameter of the upper ball; a connection between the horizontal bottom plate and the first vertical side plate transitions smoothly, and an inner surface of the connection defines a second arc-shaped groove, and the second arc-shaped groove extends in the front-rear direction and has an arc-shaped cross section, and a diameter of the second arc-shaped groove is smaller than a diameter of the lower ball.

3. The sliding rail assembly according to claim 1, wherein, a diameter of the upper ball is smaller than a diameter of the lower ball.

4. The sliding rail assembly according to claim 1, wherein, the upper sliding rail further comprises a fourth vertical side plate, and a right edge of the second inclined plate is connected with a lower edge of the third vertical side plate, and a left edge of the second inclined plate is connected with a left edge of the first inclined plate through the fourth vertical side plate.

5. The sliding rail assembly according to claim 4, wherein, the lower sliding rail is an integrated structure formed by bending a raw material plate, and the upper sliding rail is also an integrated structure formed by bending a raw material plate.

6. An automobile, wherein a sliding rail assembly is connected to the bottom of the seat of the automobile, and the sliding rail assembly is the sliding rail assembly according to claim 1.

7. The sliding rail assembly according to claim 2, wherein, a diameter of the upper ball is smaller than a diameter of the lower ball.

8. The sliding rail assembly according to claim 2, wherein, the lower sliding rail further comprising a second vertical side plate, and the second vertical side plate is connected below a right edge of the first horizontal top plate, and both the front end and the rear end of the second vertical side plate are respectively provided with limiting plates extending downwards; and the upper sliding rail further comprises a third vertical side plate, and a convex rib extending leftward is provided on the third vertical side plate; and when the upper sliding rail slides forward to a limit position, the convex rib abuts against the limiting plate at the front end; and when the upper sliding rail slides backward to another limit position, the convex rib abuts against the limiting plate at the rear end.

9. An automobile, wherein a sliding rail assembly is connected to the bottom of the seat of the automobile, and the sliding rail assembly is the sliding rail assembly according to claim 2.

10. An automobile, wherein a sliding rail assembly is connected to the bottom of the seat of the automobile, and the sliding rail assembly is the sliding rail assembly according to claim 3.

11. An automobile, wherein a sliding rail assembly is connected to the bottom of the seat of the automobile, and the sliding rail assembly is the sliding rail assembly according to claim 4.

12. An automobile, wherein a sliding rail assembly is connected to the bottom of the seat of the automobile, and the sliding rail assembly is the sliding rail assembly according to claim 5.

13. The sliding rail assembly according to claim 1, wherein an included angle between the first inclined plate and the first horizontal top plate and another included angle between the second inclined plate and the horizontal bottom plate are equal or complementary to each other.

14. An automobile, wherein a sliding rail assembly is connected to the bottom of the seat of the automobile, and the sliding rail assembly is the sliding rail assembly according to claim 13.

15. The sliding rail assembly according to claim 13, wherein, a diameter of the upper ball is smaller than a diameter of the lower ball.

* * * * *